May 2, 1939.  J. GARDINER  2,156,651

PIPE ALIGNING DEVICE

Filed May 2, 1938  2 Sheets-Sheet 1

JOHN GARDINER
*INVENTOR*

*ATTORNEY*

May 2, 1939.  J. GARDINER  2,156,651
PIPE ALIGNING DEVICE
Filed May 2, 1938  2 Sheets-Sheet 2

JOHN GARDINER
INVENTOR

Paul W. Ferguson
ATTORNEY

Patented May 2, 1939

2,156,651

UNITED STATES PATENT OFFICE 2,156,651

PIPE ALIGNING DEVICE

John Gardiner, Los Angeles, Calif.

Application May 2, 1938, Serial No. 205,565

4 Claims. (Cl. 72—128)

The object of the invention is to provide a means for rapidly assembling joints of screwed pipe.

In laying pipe lines under water or in other positions in which the relative positions of the pipe ends to be assembled are not clearly visible, it is difficult and tedious to properly align the free joint with the line already laid and to insert the pipe in the collar without damaging the threads. The device herein described and claimed greatly reduces this difficulty and permits the line to be assembled more rapidly and with no danger of cross threading.

The invention may best be explained with reference to the attached drawings, in which.

Figure 1:
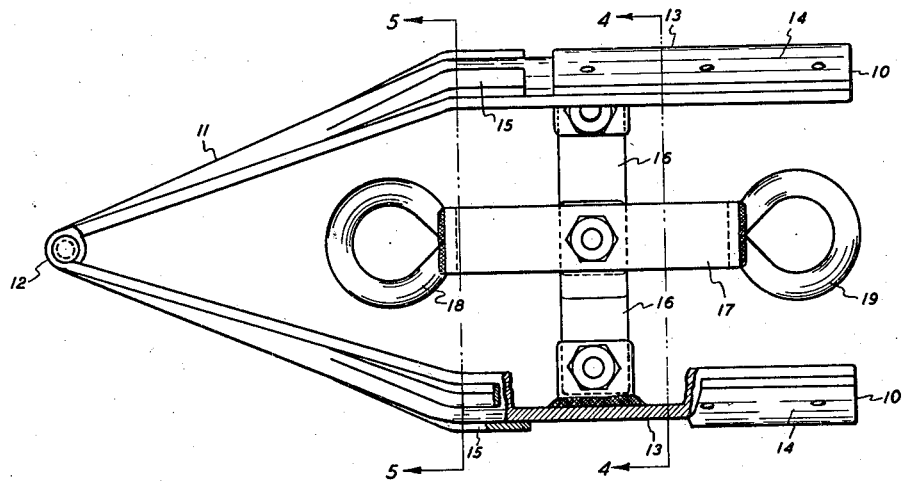
Fig. 1 is a side elevation of the device in the expanded position in which it is used, a part being broken away to show internal structure.

Referring to the drawings, 10—10 are metallic elements of arcuate section, tapering as at 11—11 toward a fine end joint 12 by which they are hinged together. These elements are so formed that when fully expanded with the faces 13—13 parallel they form segments of a cylinder having an external diameter somewhat less than the internal diameter of the pipe in which they are to be used. To these faces are riveted strips of woven brake lining 14—14 of such thickness as to bring the overall diameter slightly above the internal diameter of the pipe; so that the device will lock firmly in place in the pipe when expanded.

Similarly, to the tapering faces 11—11 are attached hardened steel guide lugs 15—15 which give this end of the device a diameter slightly less than the internal diameter of the pipe to be assembled.

Figure 2:
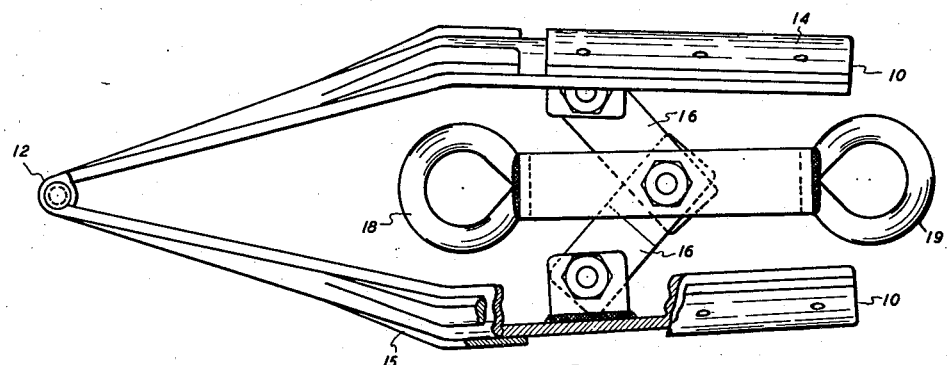
Fig. 2 is a similar view of the device in the closed position ready for withdrawal from the pipe.
Figure 3:
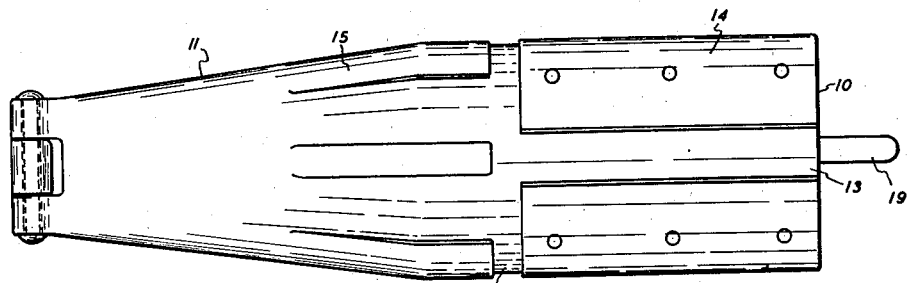
Fig. 3 is a plan view of the device in the closed position.
Figure 4:
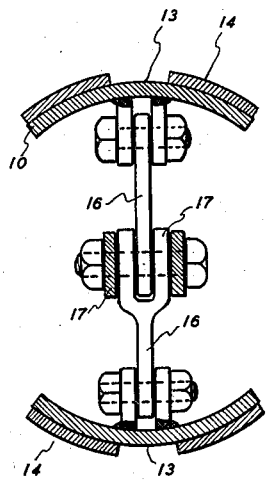
Fig. 4 is a cross section through the device as on the line 4—4 of Fig. 1.
Figure 5:
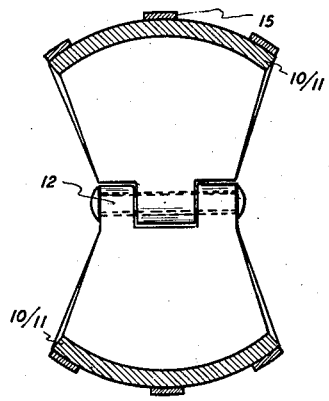
Fig. 5 is a cross section and internal elevation of the device as on the line 5—5 of Fig. 1.

Between the two sections 10—10 is placed a toggle joint consisting of two arms 16—16 pivoted in the elements 10—10 and a yoke rod 17 forming the longitudinally moving element of the toggle. This rod may be provided at each end with a ring 18—19 or other means for attaching a pull chain or rod. When the yoke rod is pulled to the right, the device collapses to the position shown in Fig. 2, in which it is free from the pipe and may be withdrawn in either direction.

In use the device is placed in the end of the pipe already laid, with the left end of brake lining strips 15 substantially flush with the end of the pipe. A sharp pull on ring 18 then expands and locks it in place. A rod somewhat longer than the joint of pipe to be attached having its end bent at a right angle is then passed through the new joint and the bent end inserted in ring 18. The joint is then guided into place by the tapering end 11 and the free end of the joint moved until the inner end slips over the guides 15, which it cannot do until the joint is in alignment with the pipe with which it is to be connected, and the new joint may then be screwed home without danger of cross-threading. A sharp inward movement of the rod then breaks the toggle joint and collapses the device, which may then be pulled through the new joint to its new position at the outer end.

I claim as my invention:

1. A pipe aligning device comprising two arcuate shoes adapted to grip the inside of a pipe and to project from the end thereof, the ends of said shoes being bent toward each other and joined by a hinge to form a tapering element projecting from said pipe, and means for forcibly moving said shoes from and toward each other about said hinge.

2. A structure substantially as defined in claim 1 in which said means for moving includes a pair of levers and a pull rod, one end of each said lever being hinged on said pull rod and the other end of each said lever being hinged on one of said shoes.

3. A device substantially as defined in claim 1 including friction pads attached to the outside of said guides for interiorly gripping said pipe.

4. A structure substantially as defined in claim 1 including hardened steel strips projecting from the surfaces of said shoes in the portions projecting from said pipe.

JOHN GARDINER.